Dec. 13, 1927.  H. E. BINGHAM  1,652,231
RELIEF VALVE
Filed Aug. 6, 1925    2 Sheets-Sheet 2
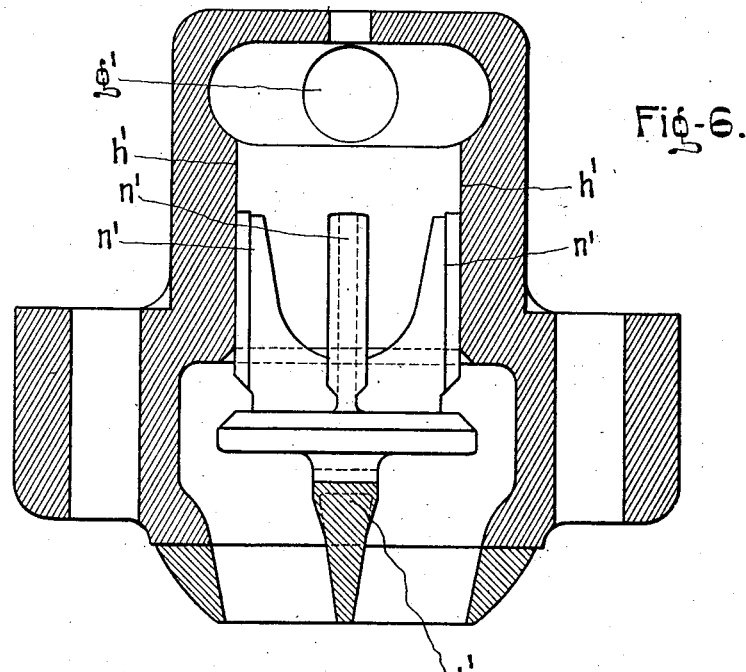
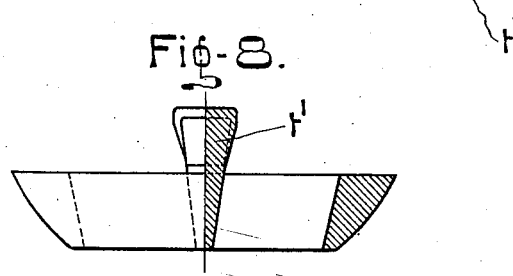
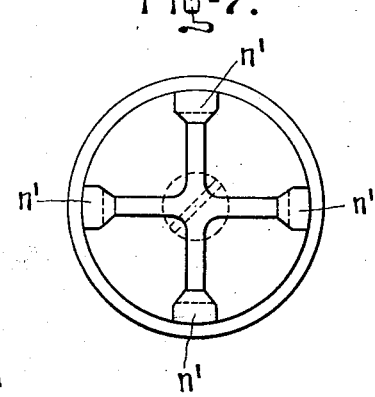
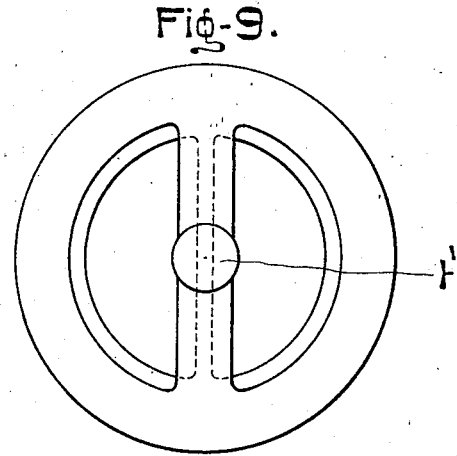
Harold E. Bingham,
Inventor,
Attorneys.

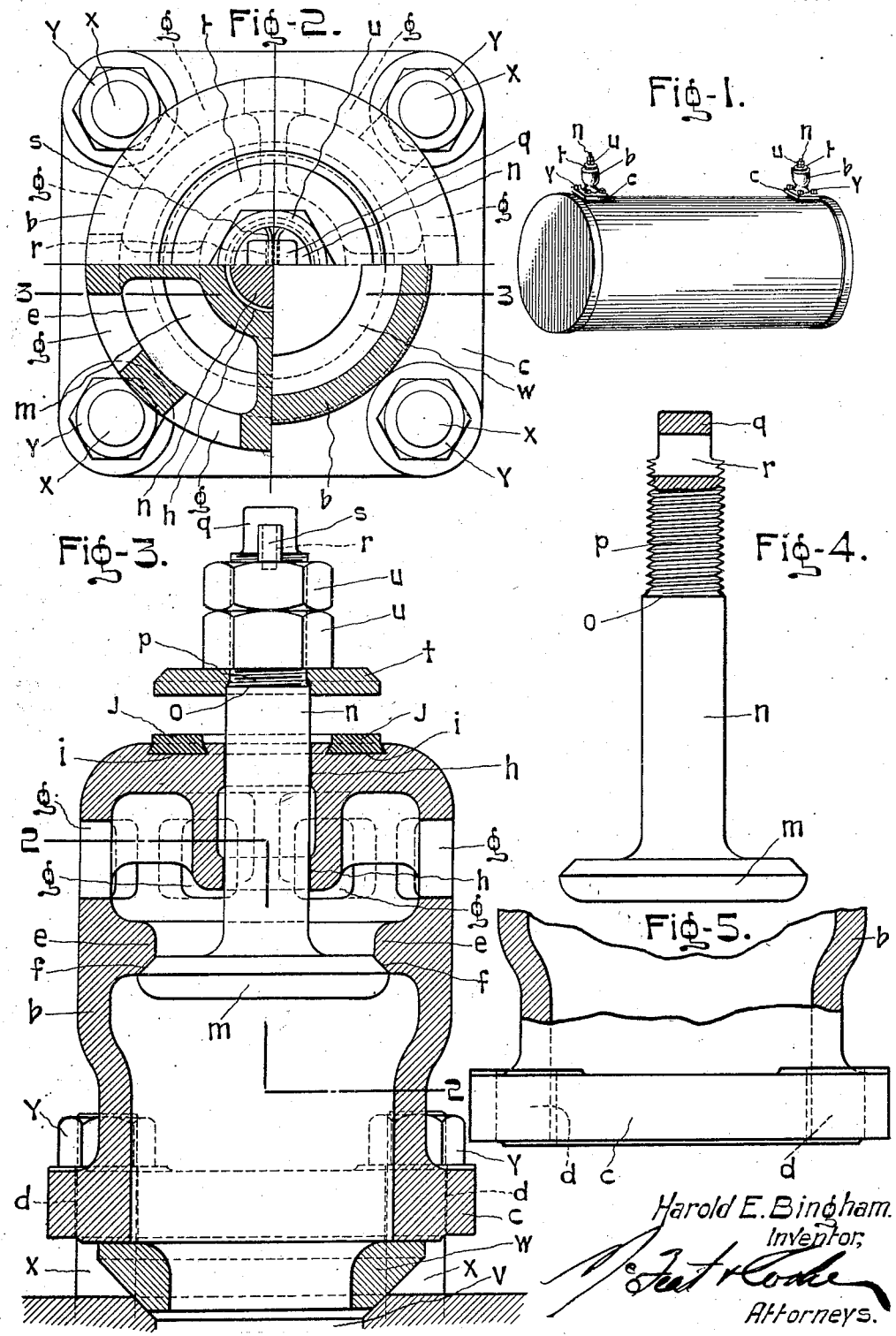

Patented Dec. 13, 1927.

1,652,231

UNITED STATES PATENT OFFICE.

HAROLD ERNEST BINGHAM, OF MONTREAL, QUEBEC, CANADA, ASSIGNOR TO HIMSELF AND CLYDE DOUGLAS THORBURN, BOTH OF MONTREAL, CANADA.

RELIEF VALVE.

Application filed August 6, 1925. Serial No. 48,597.

The invention relates particularly to relief valves for locomotive engines.

Heretofore considerable inconvenience and relatively large cost have been experienced in connection with the manufacture, installation and maintenance of relief valves for locomotive engines and in some cases the operation has been defective.

My invention has for its object to provide a simplified valve of this type and one which has a relatively low original cost and which is simple in construction, reliable in operation and possessed of practically maximum efficiency with low cost of maintenance and repairs.

The invention may be said briefly to consist of an integral valve body, preferably a one-piece casting having a ball-ring through which communication is effected between the mouth of the valve chamber and an opening in the locomotive engine cylinder. There are a pair of these openings one near each end of the cylinder and a pair of valves communicating with these openings. Within the valve body is a valve seat formed in one piece therewith and engaged by a one-way valve guided in the upper portion of the body, such upper portion being intact without openings leading into the interior of the valve body and having openings in its side communicating with the atmosphere. A stop limits the movement of the valve to full open position. The bottom of the valve chamber has formed integrally therewith a pad having holes through which studs carried by the engine cylinder protrude and present screw-threaded ends upon which nuts may be screwed for the purpose of clamping the valve rigidly to the engine cylinder with the ball-ring between them.

Within the broad idea of my invention the guide and stop for the valve may be either a straight axial valve stem guided through the top of the valve chamber and having a washer secured thereon by nuts screwed upon the upper end of the stem, a packing ring countersunk in the top of the chamber serving as a cushion for the washer when the valve is opened and its stroke is limited thereby to full open position. Or the stop for the valve proper may be located within the chamber and beneath the valve. In this form a series of guides spaced around the circumference of the valve proper may be employed to guide the valve in its movement. In this alternative form the top of the valve chamber does not have the valve guiding stem protruding therethrough. Either of these specific forms of valve guide and stop may be employed within the spirit of my invention.

For full comprehension, however, of my invention reference must be had to the accompanying drawings in which similar reference characters indicate the same parts and wherein:

Figure 1 is a detail perspective view of part of the cylinder of a locomotive engine with a pair of my improved valves applied thereto;

Figure 2 is a part plan and part horizontal sectional view of my improved valve with the preferred specific construction of valve guide and stop, the section being taken along a vertical transverse plane diametrical to the valve and the horizontal sectional view being taken on line 2—2 Figure 3 for the purpose of illustrating particularly the air openings, the pad and the ball ring and their arrangement with relation to the opening in the cylinder of the locomotive engine;

Figure 3 is a vertical sectional view taken on line 3—3 Figure 2;

Figure 4 is a detail view of the valve proper;

Figure 5 is a fragmentary view of the valve chamber and illustrating the pad in elevation;

Figure 6 is a vertical axial sectional view illustrating the alternative form of the valve guide and stop;

Figure 7 being a detail top view of the valve proper;

Figure 8 is a side elevation partly in vertical axial sectional view of the ball ring and valve stop or support; and Figure 9 is a plan view of the ball ring and valve stop or support.

My valve has an integral one-piece body $b$ with intact top $b'$ and having cast in one therewith at its lower end or mouth a pad $c$ substantially square in plan view and presenting bolt holes $d$ at its four corners. An inward annular boss $e$ cast in one with the body and located about the middle of the height presents a valve seat $f$ while the wall of the body is cast with a series of air openings $g$ and an axial bore or valve stem guide $h$. Surrounding this bore at the top of the body is a seat $i$ receiving a packing ring $j$. The valve proper $m$ has a guiding stem preferably in the form of a rod $n$ formed with a shoulder $o$, a screw-threaded portion $p$ and a square end $q$ slotted as at $r$ to receive a split cotter $s$. A washer $t$ is seated on the shoulder $o$ and held rigidly in place by a pair of nuts $u$ locked against displacement by the cotter $s$. Communication is effected between the mouth of the valve chamber and one of the relief ports or holes $v$ in the cylinder of the locomotive engine, by a ball-ring $w$. This ball-ring fits into the hole $v$ which is flared to facilitate a universal joint action which is obtained by the downwardly tapered external form of the ball-ring. The cylinder has studs $x$ screwed in holes tapped therein and projecting upwardly to be engaged by the bolt holes in the pad $c$, nuts $y$ clamping the valve casing and ball-ring in place. This detail construction of my improved relief valve is illustrated in Figures 1 to 5 inclusive. An alternative form is illustrated in Figures 6, 8 and 9, the essential difference in the alternative form is that the valve stem is divided into four stem-members $n^1$ carried around the circumference of the valve head. This form of guide requires a larger bore $h^1$ and eliminates the necessity of the stem protruding through the top of the casing which is entirely devoted to the openings $g^1$ to the atmosphere. The external stop $t$ (Figure 3) limiting the travel of the valve to its full open position has substituted therefor an internal stop or support $t^1$ cast integrally with the ball-ring as shown clearly in Figures 6, 8 and 9. It will be observed that this alternative form carries out the broad idea disclosed in Figure 3. The intact top $b'$ effectively prevents cinders and other foreign particles dropping into the valve body and resting on top of the valve when closed, and being sucked into the cylinders immediately the valve opens. The effect of the admission of cinders and other foreign particles to the valve body and subsequently to the cylinders is that the valvular surface $f$ will be destroyed and the bore of the cylinders and edge of the pistons scored. In this manner the cinders and other foreign particles will seriously damage these parts and reduce the efficiency of these engines to a great extent. My intact top to the valve body overcomes these defects.

*Operation.*

One of these valves is located at each end of the cylinder of the engine and when the throttle is closed, shutting off steam from the engine, which drifts along the track, on a downward grade for instance, the valves heretofore used have frequently failed to act and communication with the atmosphere has not been effected, thus causing the engine, then acting as a pump, to suck from the smoke box into the cylinder. Another disadvantage experienced in the past is that the valve proper did not always seat properly thus causing leakage there and fogging the engineer's view. With my improved valve, which operates entirely automatically with perfect freedom of action, leakage cannot occur; neither can the valve fail to seat properly, and there is nothing to put it out of order. Furthermore the fact that there is only one joint, which is at the ball-ring and this ball-ring is of the simplest construction and readily made of sufficient strength, there is no liability of joint leakage owing to the excessive vibration.

From the foregoing it will be seen that my improved relief valve consisting in the main as it does of an integral one piece valve body which is a casting, possesses extreme simplicity and may be produced at minimum cost. Furthermore it being an integral one piece casting, it is without joints throughout its body and thereby eliminates the repairs constantly required with relief valves at present in use to maintain the jointed parts from leaking. The valve possesses, in consequence, maximum efficiency.

What I claim is as follows:

1. In a locomotive engine relief valve, the combination with the engine cylinder having a relief hole, of an integral one piece valve body of intact cylindrical form having a flat top and air openings in the sides of the upper portion thereof below its top and having a port in its base; an inwardly extending member formed in one piece with the middle of the length of the interior of the body, and presenting a valve seat at its inner lower edge, the interior of the body below and adjacent to the member being chambered, a valve within the body and being flat and relatively thin to be within the chambered portion when open and present minimum obstruction to the flow through the valve body; the valve having an integral upwardly projecting guiding part, means for limiting the downward movement, guiding means for the valve, such guiding means including an integral part of the body, and means for securing the valve body with the port in its base in communication with the relief hole.

2. In a locomotive engine relief valve, the combination with the engine cylinder having a relief hole, of an integral one piece valve body of intact cylindrical form having an intact top, air openings in the sides of the upper portion thereof below the top and having a port in its base; an inwardly extending flange formed in one piece with the middle of the length of the interior of the body, and presenting a valve seat at its inner lower edge, the interior of the body below and adjacent to the flange being chambered, a valve within the body and being flat and relatively thin to be within the chambered portion when open and present minimum obstruction to the flow through the valve body; the valve having a straight cylindrical stem protruding through the top of the body and carrying means for limiting its downward movement; guiding means for the valve stem, such guiding means including an integral part of the body, and means for securing the valve body with the port in its base in communication with the relief hole.

In testimony whereof I have signed my name to this specification.

HAROLD E. BINGHAM.